United States Patent [19]

Daughtry

[11] Patent Number: 5,235,775
[45] Date of Patent: Aug. 17, 1993

[54] FISHING ROD LURE HOLDER

[76] Inventor: David A. Daughtry, Rte. 1 Box 92A, Fort Defiance, Va. 24437

[21] Appl. No.: 865,919

[22] Filed: Apr. 10, 1992

[51] Int. Cl.⁵ .................................................. A01K 97/06
[52] U.S. Cl. .......................................... 43/25.2; 220/326
[58] Field of Search ...................... 43/25.2, 54.1, 57.1; 206/315.11; 220/326; 24/287; D3/38; D22/139, 148

[56] References Cited

U.S. PATENT DOCUMENTS

| | | | |
|---|---|---|---|
| D. 217,663 | 5/1970 | Chamberlain | 43/25.2 |
| D. 275,388 | 9/1984 | Bailey | D3/38 |
| 1,216,069 | 2/1917 | Cammack . | |
| 2,285,888 | 6/1942 | Benton | 43/25.2 |
| 2,767,502 | 10/1956 | Reynolds . | |
| 2,792,961 | 5/1957 | Gordon | 220/326 |
| 2,868,254 | 1/1959 | Saad | 220/326 |
| 3,815,273 | 6/1974 | Perkins | 43/25.2 |
| 3,858,749 | 1/1975 | Selley | 220/326 |
| 4,203,245 | 5/1980 | Peterson | 43/25.2 |
| 4,441,274 | 4/1984 | Masur | 43/25.2 |
| 4,501,222 | 2/1985 | Stone | 118/234 |
| 4,831,772 | 5/1989 | Gillespie | 43/54.1 |
| 4,920,683 | 5/1990 | Weber | 43/25.2 |
| 4,944,111 | 7/1990 | Daniel | 43/25.2 |
| 5,056,256 | 10/1991 | Truax | 43/25.2 |

Primary Examiner—Kurt C. Rowan
Attorney, Agent, or Firm—Sheldon H. Parker

[57] ABSTRACT

A fishing lure holder is disclosed which employs a novel locking member that cooperates with the shaft of an object such, as a fishing rod, to lock the container in the closed position. The locking member thus serves to fix the container to the object such as the fishing rod and the fishing rod functions as part of the locking mechanism. The reclosable container is provided with first and second concave enclosure members. The two enclosures are hinged together, preferably, by means of what is commonly known as a living hinge. The container is maintained in a closed position by means of a substantially "S" shaped locking mechanism. Preferably two pairs of locking mechanisms are provided for better attachment to the fishing rod. Each of the "S" shaped latch element has a concave portion which extends from its respective enclosure member open edge. The latch element concave portion open in the opposite direction from the first enclosure member concave interior region.

25 Claims, 4 Drawing Sheets

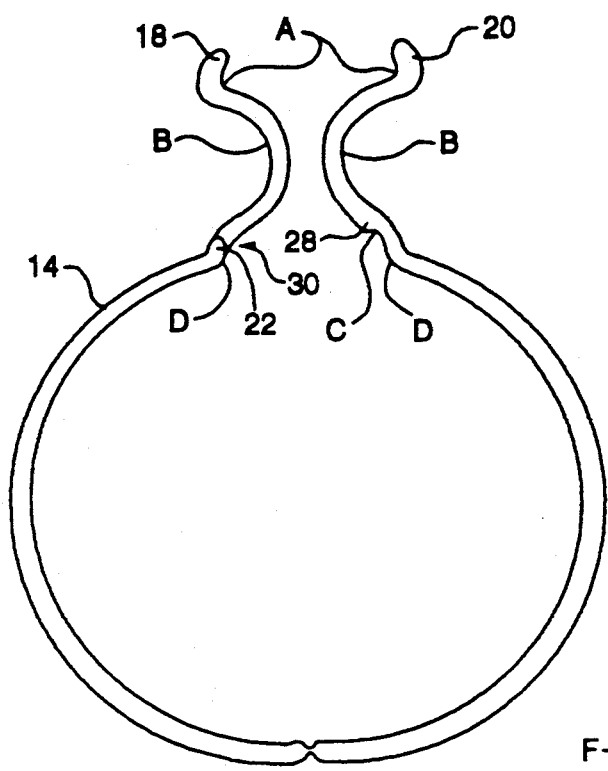
FIG. 3
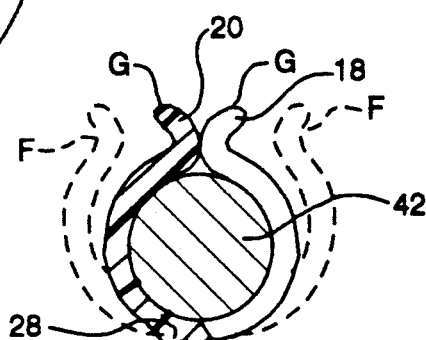
FIG. 4
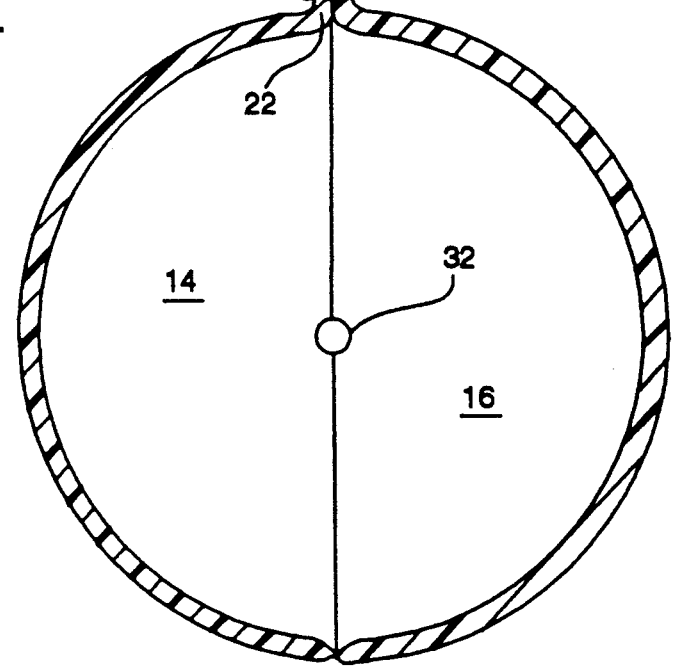

FISHING ROD LURE HOLDER

BACKGROUND OF THE INVENTION

1. Field of the Invention

The present invention relates to an improvement in a holder for fishing lure. The lure holder is easily removable from the fishing rod and, in the preferred embodiments, remains closed after removal from the rod.

b 2. Background of the Invention

The sport of fishing is a very old one and is engaged in by many people of all ages and walks of life. Over the years there have been many improvements in the types of tackle used so that it now ranges from simple hook-line and bobbers to expensive spin casting reels and rods of many types of materials and styles. However, all fishing tackle has the same problem and that is how to protect the bait or lure while not actually fishing, for example during storage of the tackle or transport to the fishing site. Any bait or lure fastened to the line can become tangled upon itself or with nearby equipment. There is also the ever present danger of the lure or bait being stepped upon or, even worse, becoming hooked to the fisherman or one of the party.

The traditional bait or lure holder has been a metal or plastics box which can be fastened on the fisherman's belt. While this may be satisfactory for some cases, it would not do for transporting or storing the fishing tackle. Also it certainly would not be suitable, for example, for a surf fisherman who might wade chest deep into the water while wearing water proof chest high waders or just a swim suit. These fishermen would need something which would protect both them and the bait or lure as they walk in the water. They would also want to keep the bait or lure out of the water and where they can get to it when they are ready to start fishing.

Attaching the bait or lure holder to the fishing rod has been a method employed by many fishermen. In U.S. Pat. No. 4,920,683 to Weber the holder for protecting lures or bait is attached to the line and pole, however the lure must be opened in order to remove the holder from the pole. This allows the chance for the items being held within the lure holder to drop out when the holder is opened. In U.S. Pat. No. 2,767,502, Reynolds, the lure holder must also be opened to be removed from the fishing rod. In U.S. Pat. No. 4,944,111, Daniel, a hinged cylindrical lure holder is provided wherein the fishing pole is placed in the center of the lure holder. The lure holder is kept closed through use of a pair of attached hook and loop pile fasteners. Again, the lure holder must be opened to remove it from the pole.

The minnow holder of U.S. Pat. No. 1,216,069 to Cammack discloses a holder for fish hooks. The holder is secured to the pole through use of a clamp device attached to the holder. The holder can be removed from the pole without being opened, however the wing nut attachment does not allow for easy removal. The tackle box disclosed in U.S. Pat. No. 4,831,772 to Gillespie, discloses a tackle box which as individual smaller containers which can be removably attached to the fishing pole. The containers are attached through use of material such as Velcro which, although easily removable, does not necessarily provide the security for heavy containers which may be desired. U.S. Pat. No. 5,056,256 to Truax discloses a holder for a rod which slides onto the rod and holds the lure. The Truax device is not rapidly removable from the rod. In U.S. Pat. No. 2,285,888 to Benton uses spring loops to attach the bait retainer to the rod. The bait retainer opens from the bottom and during use could unlock the loops holding the retainer in place. The fishhook holder illustrated in Des. No. 217,663 shows a snap on type of lure holder which has a sliding front panel for insertion of the hook.

In U.S. Pat. No. 3,815,273, Perkins, a device is disclosed which retains the fish hook against the rod through use of an open clip on system or magnetics. It does not, however, totally enclose the hooks to prevent them from snagging or catching. In U.S. Pat. No. 4,203,245 to Peterson, another holder for the lure being used is disclosed in a wrap of flexible material which is secured to the rod and wraps around the lure and secured upon itself.

Although the above patents overcome many of the inherent dangers of dealing with fishhooks, they do not overcome the convenience problems. The instant invention overcomes the problems associated with the prior art patents by not only providing a safe but convenient and secure storage system.

SUMMARY OF THE INVENTION

It has now been found that the problems of the prior art can be overcome through the use of a container which employs a novel locking member. The locking member cooperates with the shaft of an object such as a fishing rod, to lock the container in the closed position. The locking member thus serves to fix the container to the object such as the fishing rod and the fishing rod functions as part of the locking mechanism.

In accordance with the present invention, a reclosable container is provided which has as two major components, a first enclosure member and a second enclosure member. Each of said enclosure members haves a concave interior, at least a first peripheral edge and a second peripheral edge. The two enclosures are hinged together, preferably, by means of what is commonly known as a living hinge. As well known in the art, certain plastics are capable of repeated flexures without fatiguing and can form self hinges, or living hinges.

The container is maintained in a closed position by means of locking mechanism. The locking mechanism includes substantially "S" shaped latch elements on the open edge of each enclosure member. Preferably two pairs of locking mechanisms are provided for better attachment to the fishing rod. Each of the "S" shaped latch element has a concave portion which extends from its respective enclosure member open edge. The latch element concave portion open in the opposite direction from the first enclosure member concave interior region. It is not intended to imply that the container is necessarily cylindrical in configuration, but rather is intended to include rectangular configurations.

Each latch element is positioned relative to the other of a pair such that when the first enclosure member and the second enclosure member are in their closed position the "S" shaped latch element are proximate each other to form a cooperative pair of latch elements. They which cooperate to form an enclosure having a substantially circular configuration to receive and enclose an elongated cylindrical member, such as a fishing rod. When the enclosure members are in the closed position and an elongated cylindrical member is enclosed by the latch elements the enclosure members are precluded from moving apart to the open position. Withdrawing the fishing rod permits the container to open. The latch elements have an upper region which curves in the reverse direction from the curvature of the latch elements' lower region, thereby forming a substantially "V" shaped entrance region. The exact shape of the entrance region is not narrowly critical, and the term "V" shaped is merely intended to indicate an upwardly expanding opening. Thus, the rod enters the entrance region at the point of maximum separation and as it is forced downwardly between the outwardly extending members, it forces the resilient elements apart. When the fishing rod passes from the entrance region into the lower region, the upper region snaps together, due to the flexible or resilient nature of the material of the container.

The use of two pairs of latch elements provides for the desired stability on the fishing rod and prevents the twisting of the container relative to the fishing rod.

In order to maintain the container in the locked, that is closed, position when the container is separated from the fishing rod, a locking mechanism is provided. The locking mechanism is position on at least one, but preferably both of the "S" shaped latch elements. They are positioned to cooperate with a locking means on another "S" shaped latch element, such that when the enclosure members are in the closed position the locking mechanism releasably locks the container in the closed position. The term "releasably locking" as used herein refers to the lock exerting sufficient force to maintain the enclosures in the closed position, but being sufficiently flexible to release under hand pressure applied by a user.

The locking mechanisms are preferably affixed to adjoining sides of the body of the "S" shaped latch elements.

BRIEF DESCRIPTION OF THE DRAWINGS

FIG. 3 is a side view of the lure holder of FIG. 1 prior to closure;

FIG. 4 is a side view of the lure holder of FIG. 1 in the closed position;

DETAILED DESCRIPTION OF THE INVENTION

Figure 1:
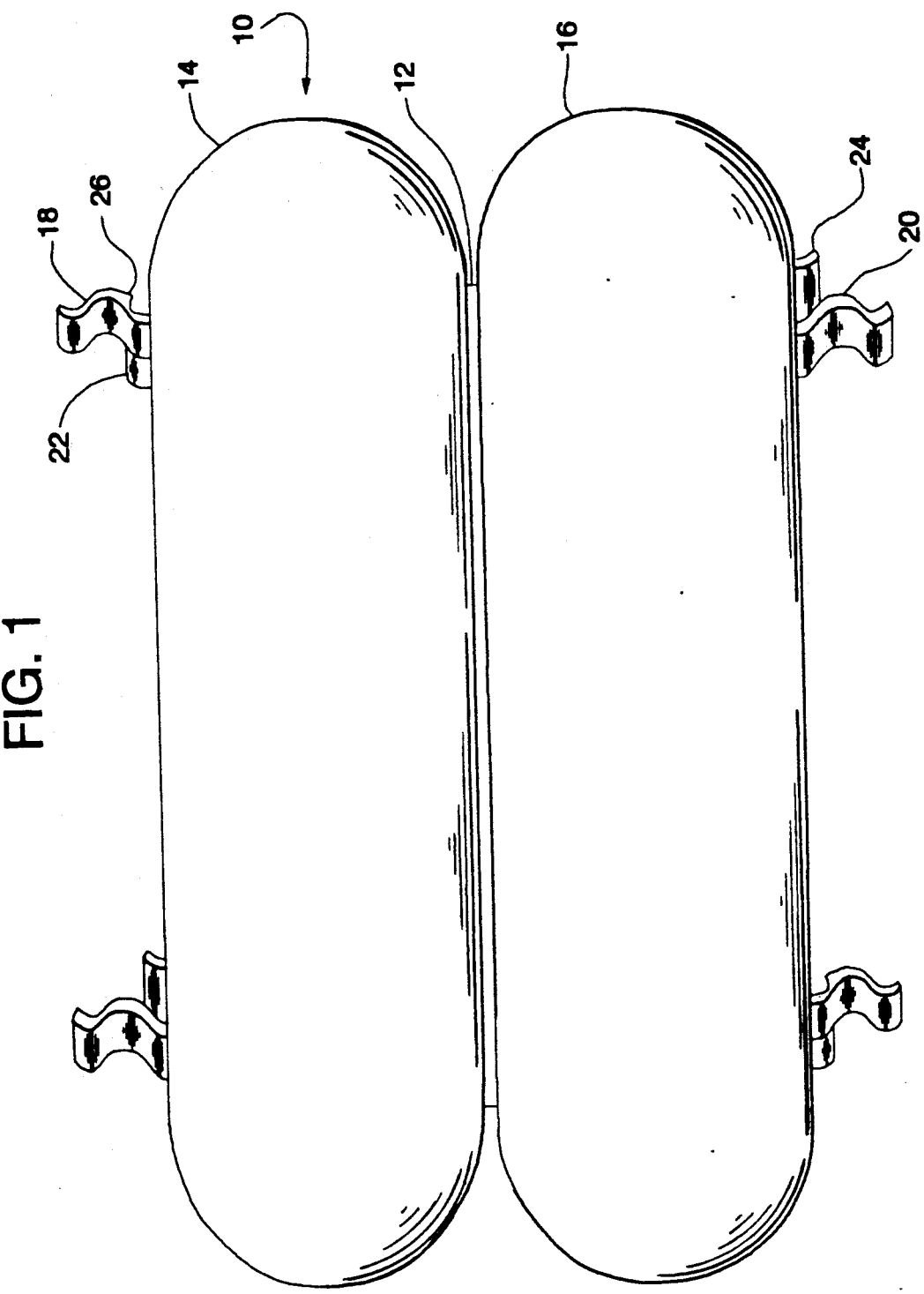
FIG. 1 is a top view of the lure holder of the instant disclosure.

The open lure holder 10 is illustrated in FIG. 1 ready to receive the lure. The lure holder 10 has two sides 14 and 16, connected by a living hinge 12. The two sides or enclosures, 14 and 16 are folded at the hinge 12 and locked together through a pair of latches 18 and 20 which are an integral part of the sides 14 and 16 respectively. The latches 18 and 20 are offset so that when closed they are adjacent to one another. The lure holder 10 can be an oval shape, as illustrated in FIG. 1, or the shape of a fish, rectangle, etc.

Figure 2:
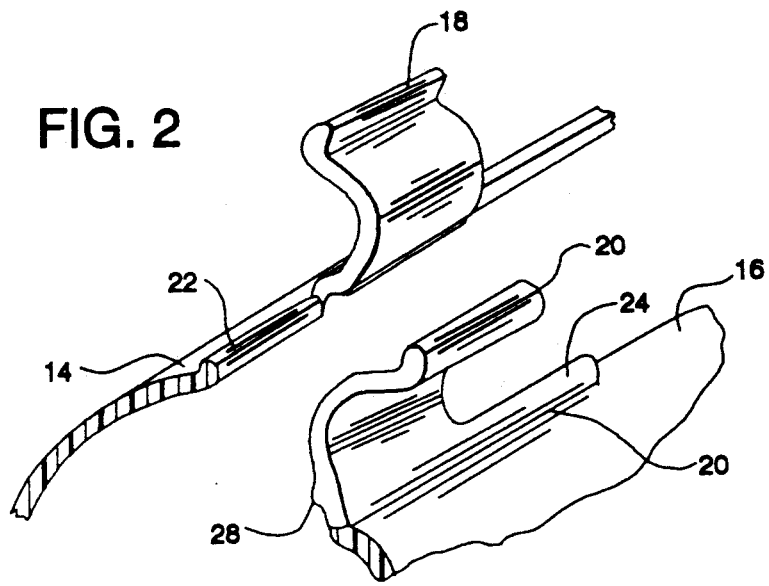
FIG. 2 is a partial perspective view of the latches of the FIG. 1.

In the preferred embodiment, the latches 18 and 20 have a compound curved configuration, forming an "S" shape on at least the interior portion as illustrated in FIGS. 2 and 3, and have locking bars 22 and 24. As shown in FIG. 2, the locking bars 22 and 24, run along a portion of the top of the sides 14 and 16 adjacent to the latches 18 and 20. The locking bars 22 and 24 are positioned so as to be opposite to and interact with their opposing latches 18 and 20. Thus, latch 20 interacts with locking bar 22 and latch 18 interacts with locking bar 24. The side view provided in FIG. 3 illustrates the compound curves more clearly. The concave curves "A" will, when the lure holder 10 is closed, cause the tops of the latches 18 and 20 to curve away from the center, as shown in FIG. 4. This creates a smooth V shaped surface to direct the fishing rod into the rod receiving area 42 during insertion. The concave curves "B" cause the latches 18 and 20 to curve around and create a rod receiving area 42, shown in FIG. 4. The concave curves "C", in combination with the lips 28 and 30, form the snap lock portions which interlock with the locking bars 22 and 24. The convex curves "D" serve to connect the latches 18 and 20 to the sides 14 and 16 and as well as provide the stop portion against which the locking bars 22 and 24 rest. The lips 28 and 30 extend slightly beyond the body of the latches 18 and 20 and must be dimensioned so as to interlock with the locking bars 22 and 24 to provide the snap lock fit. If the area between the lips 28 and 30 and the convex curve "D" is too great the locking action will not take place. If the area is too small, with respect to the diameter of the fishing rod, it will not be possible to slide the lips 28 and 30 over the locking bars 22 and 24.

The latches 18 and 20, in the preferred embodiment, are manufactured from a slightly flexible material which allow the latches 18 and 20 to accommodate for the taper of the fishing rods. Two of the many different positions are illustrated in FIG. 4. Position G illustrates the minimum size obtainable by the latches 18 and 20 and Position F illustrates the approximate maximum size safely obtainable by the latches 18 and 20. The latches 18 and 20 must be closed to the point where the locking bars 22 and 24 are locked and the latches 18 and 20 are able to grip the fishing rod. The ability to fit the taper of the fishing rods provides the advantage that the lure holder can be placed in a position which is comfortable and convenient for the user. The gauge of the material must, however, be heavy enough to hold the weight of the materials of the lure holder and the equipment held within. As an alternative, the the latches 18 and 20 can be a rigid material, however this limits the available positioning of the lure holder.

The line receiving area 32, as shown in FIG. 4, is cut into both of the sides 14 and 16. The line receiving area 32 receives the fishing line from the rod when the lure is placed inside the lure holder 10. The line receiving area 32 can be either round, as illustrated, or oblong. An alternative method would be to slot only one of the sides.

Figure 5:
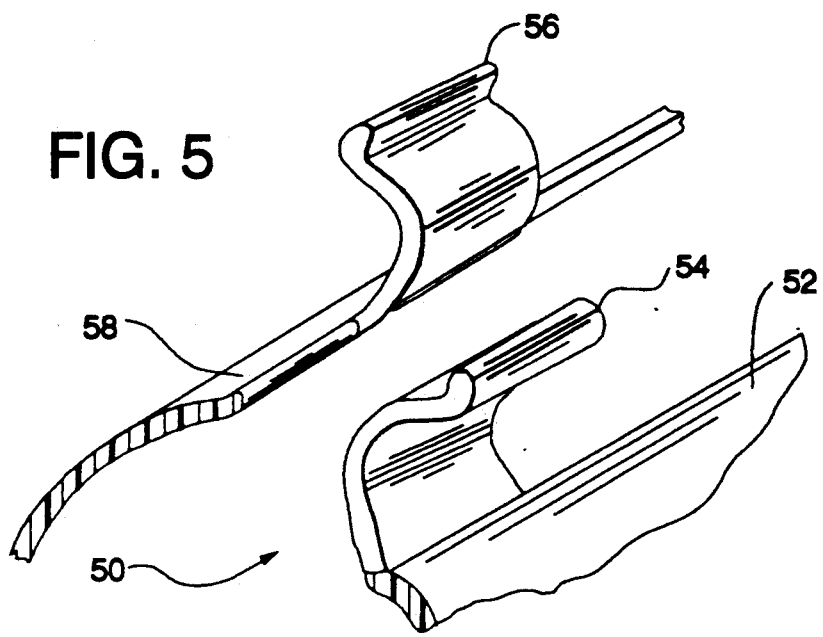
FIG. 5 is a partial perspective view of an alternate embodiment to the latches of the instant invention.

An alternate embodiment to the latching system is illustrated in FIG. 5 wherein the locking bars 22 and 24 have been eliminated. The latches 56 and 54 cross over one another and are kept in position by the insertion of the fishing rod. The lure holder 50 will not stay closed on its own but depends on the rod to prevent the latches 54 and 56 from separating.

Figure 6:
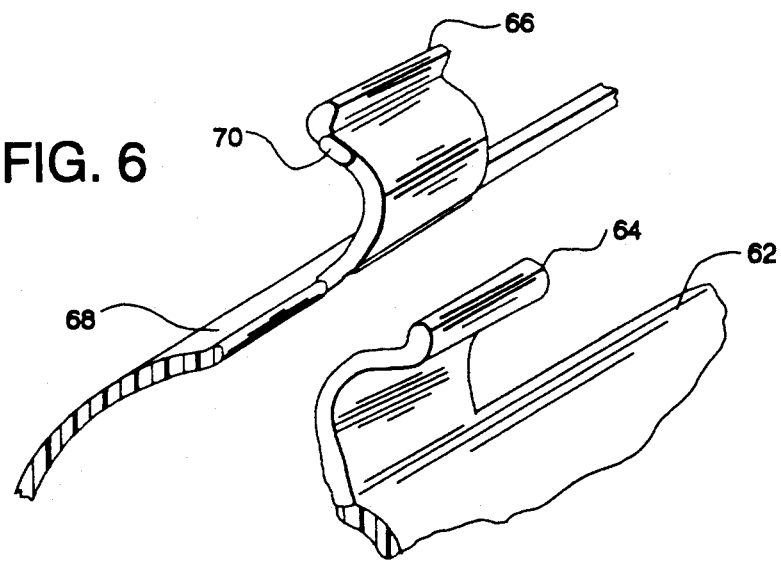
FIG. 6 is a partial perspective view of an additional embodiment to the latches of the instant invention.
Figure 7:
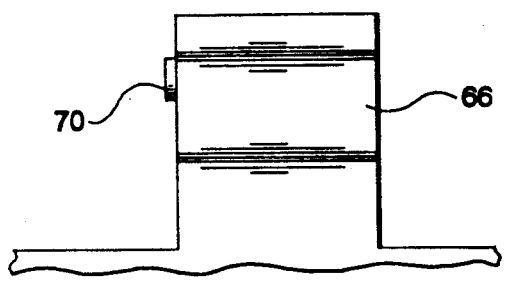
FIG. 7 is a front view of the latch of FIG. 6.

An additional latching system is disclosed in FIGS. 6 and 7 wherein a locking nodule 70 is placed on each of the latches 64 and 66. This method of locking two items is well known in the prior art relating to women's pocketbooks. The shape of the nodule 70 is optional and can be offset circles, ovals or rectangles. The latching system of FIGS. 6 and 7 will stay closed without the fishing rod.

Figure 8:
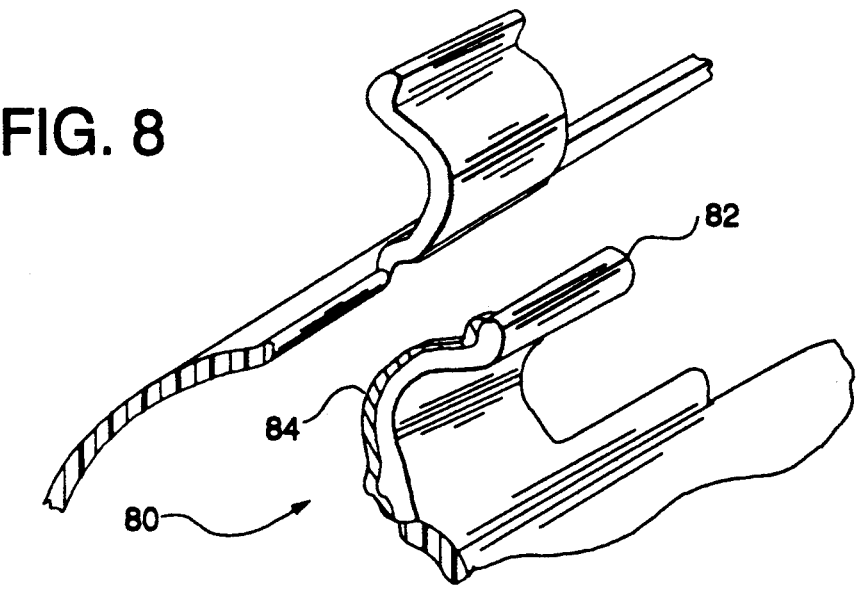
FIG. 8 is an alternate embodiment of the latch of FIG. 2.

In FIG. 8, a modification to FIG. 2 is illustrated wherein a strengthening ridge 84 is added to the latch 82 of the lure holder 80. The strengthening ridge 84 provides rigidity to the latch 82 and allows for a lighter gauge material for the manufacture of the latch mechanism.

What is claimed is:

1. A lure holder, said lure holder comprising
a first enclosure member and a second enclosure member; each of said enclosure members having at least a first edge and a second edge;
hinge means, said hinge means connecting said first enclosure member and said second enclosure member along said first edge, to form a pair of enclosure members;
at least a pair of latch means, each of at least a pair of latch means having a first compound curved latch means and a second compound curved latch means, said first compound curved latch means being positioned on said first enclosure member second edge and said second compound curved latch means being positioned on said second enclosure member second edge; each of said compound curved latch means have a portion which is substantially in the shape of a semi-circle and being positioned such that when said first enclosure member and said second enclosure member are in their closed position said first compound curved latch means and said second compound curved latch means are proximate each other to cooperate to form an enclosure having a substantially circular configuration to receive and enclose and elongated cylindrical member.

2. The lure holder of claim 1, further comprising at least one pair of concave curved locking means, the first concave curved locking means being formed by said first compound curved latch means and the second concave curved locking means being formed by second compound curved latch means, said pair of concave curved locking means being proximate said enclosure members.

3. The lure holder of claim 2 wherein each of the at least a pair of said latch means has locking bar means adjacent said compound curved latch means, said locking bar means interacting with said concave curved locking means to hold said enclosure members in the closed position.

4. The lure holder of claim 1, wherein each pair of said compound curved latch means are proximate one another when said enclosure members are in the closed position.

5. The lure holder of claim 1 wherein said locking means of said pair of compound curved latch means engage each other when said enclosure members are in the closed position.

6. The lure holder of claim 5, wherein said locking means interact to maintain the lure holder in a closed position.

7. The lure holder of claim 1 wherein said compound curved latch means are flexible members.

8. The lure holder of claim 1 further comprising a fishing line receiving area, said fishing line receiving area being openings in the ends of said enclosure member formed by cooperating notches in the peripheral ends of said first and said second enclosure members.

9. The lure holder of claim 1 wherein said locking means are extended nodules affixed to adjoining sides of the body of said compound curved latch means.

10. The lure holder of claim 1 wherein said hinge means extends at least along at least a portion of said first side of said enclosure member.

11. The lure holder of claim 1 wherein said hinge is a formed from the material of said enclosure member.

12. The lure holder of claim 1, wherein each pair of said compound curved latch means are proximate one another when said enclosure members are in the closed position.

13. The lure holder of claim 1 wherein said compound curved latch means have a substantially compound curved interior surface.

14. The reclosable container, said container comprising:
a first enclosure member and a second enclosure member; each of said enclosure members having an interior, at least a first peripheral edge and a second peripheral edge;
hinge means, said hinge means connecting said first enclosure member and said second enclosure member along at least a portion of said first peripheral edge, to form a pair of cooperating enclosure members;
enclosure locking means, said enclosure locking means, including, a first substantially compound curved latch means on said first enclosure member and a second substantially compound curved latch means on said second enclosure member, said first compound curved latch means being positioned on said first enclosure member second peripheral edge and said second compound curved latch means being positioned on said second enclosure member second peripheral edge;
said first compound curved latch means having a concave portion which extends from said first enclosure member second edge, said latch means concave portion opening in the opposite direction from said first enclosure member concave interior region,
said second compound curved latch means having a concave portion which extends from said second enclosure member second edge, said latch means concave portion opening in the opposite direction from said second enclosure member concave interior region,
said first and said second latch means being positioned relative to each other such that when said first enclosure member and said second enclosure member are in their closed position said first compound curved latch means and said second compound curved latch means are proximate each other to form a cooperative pair of latch means which cooperate to form an enclosure having a substantially circular configuration to receive and enclose an elongated cylindrical member, whereby when said first and said second enclosure members are in the closed position and an elongated cylindrical member is enclosed by said first and said second latch means said first, said first and said second enclosure members are precluded from moving apart to the open position.

15. The reclosable container of claim 14, wherein said first and second compound curved latch means have an upper region which curves in the reverse direction from the curvature of said latch means thereby forming a substantially "V" shaped entrance region.

16. The reclosable container of claim 14, wherein said reclosable container includes two pair of latch means.

17. The lure holder of claim 14, further comprising at least one pair of concave curved locking means, the first concave curved locking means being formed by said first compound curved latch means and the second concave curved locking means being formed by second compound curved latch means, said pair of concave curved locking means being proximate said enclosure members.

18. The lure holder of claim 17 wherein each of the at least a pair of said latch means has locking bar means adjacent said compound curved latch means, said locking bar means interacting with said concave curved locking means to hold said enclosure members in the closed position.

19. The reclosable container of claim 18, herein each of the pair of said compound curved latch means further comprises a locking means on its second edge adjacent said compound curved latch means.

20. The reclosable container of claim 14, wherein each pair of said compound curved latch means are proximate one another when said enclosure members are in the closed position.

21. The reclosable container of claim 19, wherein said locking means of said pair of locking means engage each other when said enclosure members are in the closed position.

22. The reclosable container of claim 14, wherein said compound curved latch means are flexible members.

23. The reclosable container of claim 14, wherein said locking means are affixed to adjoining sides of the body said "S" shaped latch means.

24. The reclosable container of claim 14, wherein said hinge means extends at least along at least a portion of said first side of said enclosure member.

25. The reclosable container of claim 14, wherein said hinge means in integrally formed with said first enclosure and said second enclosure.

* * * * *